United States Patent [19]

Kerker

[11] Patent Number: 4,586,683
[45] Date of Patent: May 6, 1986

[54] ROLLING AERIAL REFUELING BOOM

[75] Inventor: Richard Kerker, Los Angeles, Calif.

[73] Assignee: McDonnell Douglas Corporation, Long Beach, Calif.

[21] Appl. No.: 622,914

[22] Filed: Jun. 21, 1984

Related U.S. Application Data

[63] Continuation of Ser. No. 19,783, Mar. 12, 1979, abandoned, which is a continuation of Ser. No. 870,644, Jan. 19, 1978, abandoned.

[51] Int. Cl.⁴ ............................................. B64D 39/00
[52] U.S. Cl. .................................................. 244/135 A
[58] Field of Search ............ 244/135 A, 135 R, 137 R, 244/136; 141/284, 387, 388

[56] References Cited

U.S. PATENT DOCUMENTS

| | | | |
|---|---|---|---|
| 2,670,913 | 3/1954 | Castor et al. | 244/135 A |
| 2,859,002 | 11/1958 | Leisy | 244/135 A |
| 3,601,342 | 8/1971 | Piasecki | 244/137 R |
| 4,072,283 | 2/1978 | Weiland | 244/135 A |
| 4,150,803 | 4/1979 | Fernandez | 244/135 A |

Primary Examiner—Galen L. Barefoot
Attorney, Agent, or Firm—Paul T. Loef; George W. Finch; Donald L. Royer

[57] ABSTRACT

An improvement in an aircraft refueling boom wherein the boom support attachment provides two axes of motion. The first axis, attached to the fuselage, provides for lateral motion of the boom about a longitudinal or roll axis of rotation essentially parallel to the air stream. The second axis of motion, the pitch axis, is located below and perpendicular to the roll axis so that the pitch axis rolls with any roll motion of the boom and provides for vertical displacement of the boom. The resultant boom nozzle motion is such that vertical displacement occurs in a conventional fashion while lateral displacement takes place in an arc or rolling motion rather than a yawing motion.

10 Claims, 5 Drawing Figures

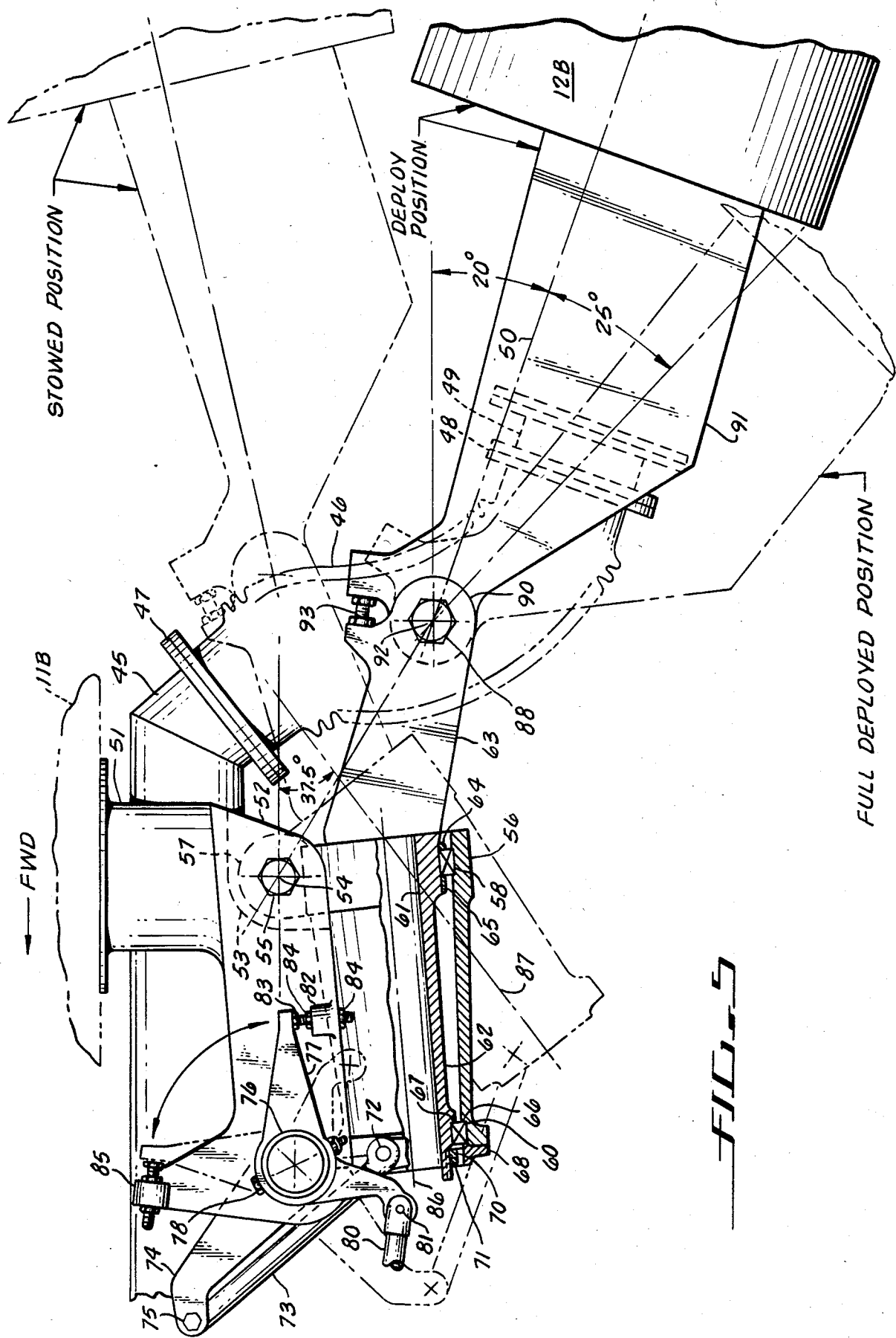

ROLLING AERIAL REFUELING BOOM

STATEMENT OF GOVERNMENT INTEREST

The invention described herein may be manufactured and used by or for the Government for Governmental purposes without the payment of any royalty thereon.

This is a continuation, of application Ser. No. 019,783, filed Mar. 12, 1979, which was a continuation of Ser. No. 870,644, filed Jan. 19, 1978 both now abandoned.

BACKGROUND OF THE INVENTION

This invention relates to an aerodynamically controlled, universally mounted, telescoping refueling boom for transfering fuel in flight from a tanker airplane to a receiver airplane.

While the primary use of the present invention is in the field of inflight refueling of aircraft it would apply equally to any similarly deployed boom or strut for any other purpose. Currently, various systems are used for the inflight refueling receiver aircraft by another tanker aircraft. One system employs a drogue/probe device, where the receiver aircraft includes a probe which is literally flown into a drogue unit. The drogue is a funnel-shaped receptacle attached to a long hose suspended from the tanker aircraft. While the system has enjoyed some success, it requires the various receiving aircraft to be capable of rather precise control, and carry a fixed or telescoping boom to support the probe. Since the refueling hose must be extended and retracted from the tanker, as on a reel, the hose must be small in diameter, severely restricting the rate of refueling.

Another system currently in vogue comprises a boom which extends downwardly and rearwardly from the tanker aircraft. The receiver aircraft connects to a nozzle located at the end of the boom. This invention relates to this type system and is directed to improving the boom design, the boom attachment means to the tanker structure, and the means for aerodynamically controlling the boom.

There are four known U.S. patents which disclose aerodynamically controlled, universally mounted, telescoping refueling booms; U.S. Pat. Nos. 2,663,523 LEISY I; 2,670,913, CASTOR EL AL; 2,960,295, SCHULZE; and 2,859,002, LEISY II. All four references disclose a two-axis pivot means for attaching the boom to the tanker wherein lateral or sideward displacement of the boom occurs about a vertical axis. This motion provides a true yawing boom, with the long boom dimension exposed to the air stream, and the resulting large yawing moments which resist the rotation. The first three references disclose a universal type pivot mount generally as shown in FIG. 2. The fourth reference provides a gimbal-type pivot mount wherein the two mutually perpendicular axes of rotation lie in a single plane; however, lateral displacement of the boom still occurs about a vertical axis. The last reference, LEISY II, further teaches a third axis of control about the longitudinal center line of the boom. The roll axis, as taught in LEISY II, is not fixed in relationship to the fuselage centerline but rotates with motion about either of the other two axes of motion. The boom is allowed to swing both laterally and vertically without restraint. However, rotation of the boom about its longitudinal axis is, and must be, controlled. The control in the roll axis is essential because the boom is a well faired aerodynamic section, which is in effect a thick high aspect ratio wing which is twisted or rotated so as to develop sideward lift and thereby control lateral displacement of the boom. As taught, the vertical vane on the boom is removed and the sideward lift provided by the rotated boom is the sole force to control lateral displacement of the boom.

Prior art refueling booms have problems of maneuverability owing principally to the high cross-flow drag of the thick boom sections, particularly at large lateral or yaw deflections and high mach numbers. The prior art employs boom sections which are thick ellipses which provide some drag and air-loads reduction when the boom is rotated in the plane of symmetry of the tanker or the pitch plane of the boom. However, further streamlining of the boom section would increase the chord axis of the boom and since lateral or yaw displacement of the boom occurs about a vertical axis further increasing the chord would further increase already large yawing moments which resist the lateral displacement of the boom. Furthermore, increasing the chord would increase an already thick wake downstream of the yawed section and would further limit the effectiveness of the control vanes.

Another source of deficiency in the prior art is the "vee" control vane configuration. This configuration suffers from high induced drag and low effectiveness when operating as a rudder with large differential deflections required to trim the large sideloads when the boom is yawed to its limits. The "vee" type vane configuration also requires a bulbous fairing around the wide bearing mounts required to support the cantilevered control surfaces and clearance cutouts which further disturb the airflow around the vanes.

The primary object of this invention is to reduce the boom aerodynamic cross-flow drag and to accomplish same without the addition of mechanisms, controls or heavy fairings. This objective is best accomplished by providing a boom motion which allows the use of a more ideally faired boom section which is maintained closely aligned with the air stream.

A further objective of the invention, and as a result of the reduction in air load and the constant alignment of the boom section with the air stream, is to provide smaller control vanes of a more practical and efficient configuration.

SUMMARY OF THE INVENTION

In accordance with the foregoing objects, a low drag aerial refueling boom which is approximately aligned with the ambient air stream throughout the flight envelope is provided. The boom upper end is attached to the tanker aircraft via a pair of support pivots which provide two axes of motion. The first axis is fixed to the tanker aircraft, essentially longitudinally oriented and approximately parallel to the tanker waterline and therefore approximately parallel to the air stream. The second axis is horizontally oriented, perpendicular and attached to the first axis so that it rolls with the boom about the longitudinal first axis. The resultant boom motion is such that vertical or pitch displacement occurs in a conventional fashion about the second axis. However, since the pitch axis rotates with the boom and is always deflected when the boom is in the refueling envelope, rotation about the roll axis produces lateral displacement by scribing an arc about the rotation axis. This novel feature contrasts with the prior art where lateral motion occurs about a vertical axis to produce a true yawing motion.

Since the roll axis is always approximately parallel to the air stream, the boom cross section, which is faired to a thick airfoil shape for reduced drag, always presents its leading edge to the airflow. This is true regardless of the roll deflection required to position the nozzle laterally. Thus, the rolling boom develops minimal lateral air loads, allows lower drag boom sections within close chord-length constraints since the angle of attack range is very small, and makes possible smaller and more efficient control vanes.

BRIEF DESCRIPTION OF THE DRAWING

The foregoing objects and many of the attendant advantages of this invention will become more readily appreciated as the same becomes better understood by reference to the following detailed description when taken in conjunction with the accompanying drawings, wherein:

FIG. 5 illustrates a reduction to practice in side view of the pivot means concept of FIG. 3 and FIG. 4 with phantom lines showing alternate boom positions at full stowed position and full deployed position. The fuel line is not shown for purposes of clarity, in the alternate boom positions.

DETAILED DESCRIPTION OF THE ILLUSTRATIVE EMBODIMENT

Figure 1:
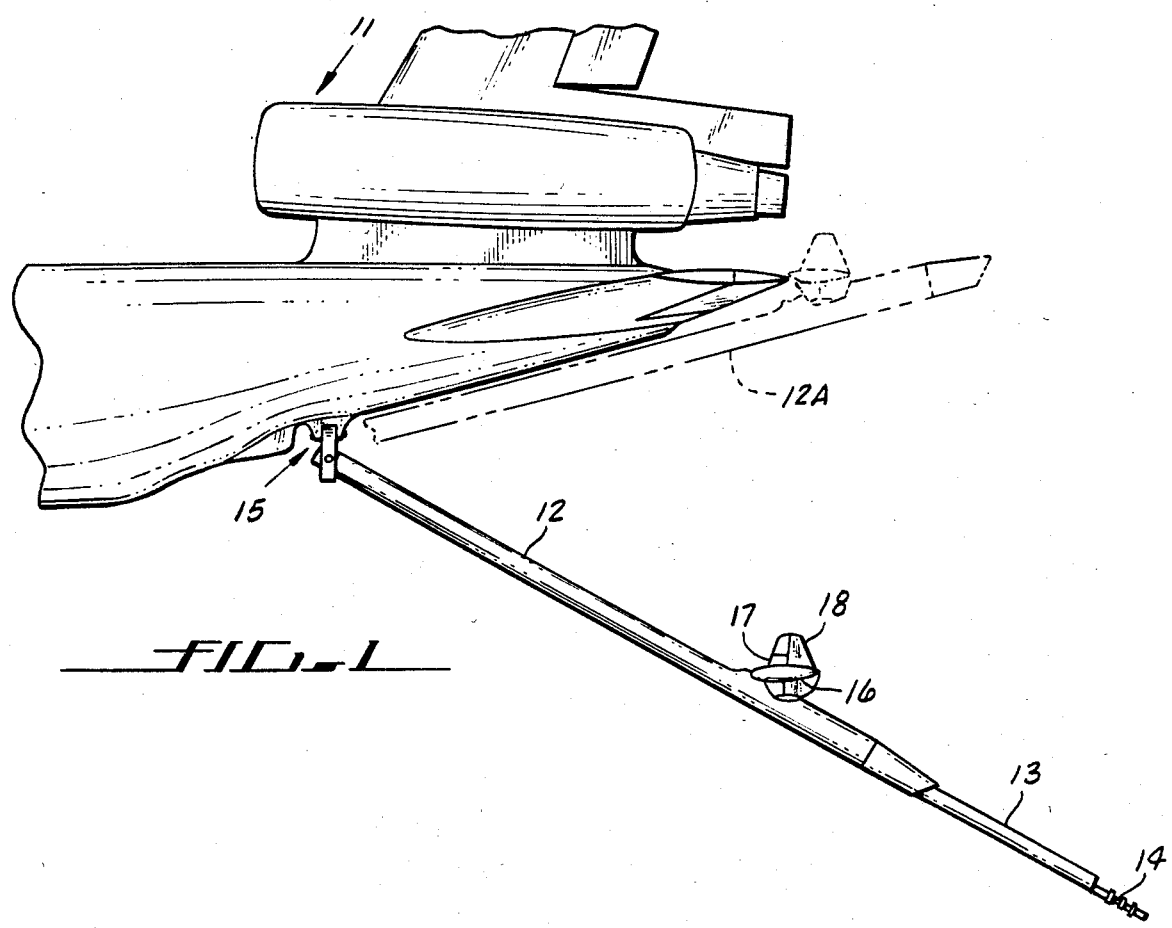
FIG. 1 is a pictorial diagram of the aft end of the tanker aircraft showing the telescoping refueling boom in the deployed position and also showing, in phantom, the stowed position of the boom.

FIG. 1 is a pictorial diagram illustrating the aft end of a tanker aircraft 11 with a telescoping aerial refueling boom 12 shown generally downwardly and rearwardly of the tanker aircraft within the refueling envelope. Integrally attached to the boom is a horizontal lift surface called an elevator 16 which is either a one-piece horizontal vane or alternately has a hinged trailing edge surface for control. A fixed fin 17 is attached to each outboard end of the elevator 16. The fins 17 support the hinged rudders 18 and the rudder actuators, not shown. The elevator 16 and the twin rudders 18 are used to control the position of the boom in elevation and azimuth.

The outer end portion 13 of the boom 12 is a telescoping section for inward and outward movement of the boom. Located on the distal end of the telescoping tube 13 is a nozzle 14. The receiver aircraft, not shown, is equipped with an aerial refueling receptacle which engages with the nozzle 14 for the refueling operation.

The actual boom motion is determined by the boom attach mechanism 15, 15A, which will be explained in detail later. The boom operator, not shown, is located in the tanker aircraft 11 in a position to observe the receiver aircraft. The boom operator guides the boom 12 so as to line the boom nozzle 14 with the receiver aircraft receptacle. When the boom nozzle 14 is dynamically aligned with the receiver receptacle the boom operator extends the telescoping portion of the boom 13 so that the nozzle 14 engages the receptacle to complete the coupling. The coupling, of course, must be accomplished and maintained within a predetermined refueling envelope to avoid a disconnect.

Figures 2, 3, 4:
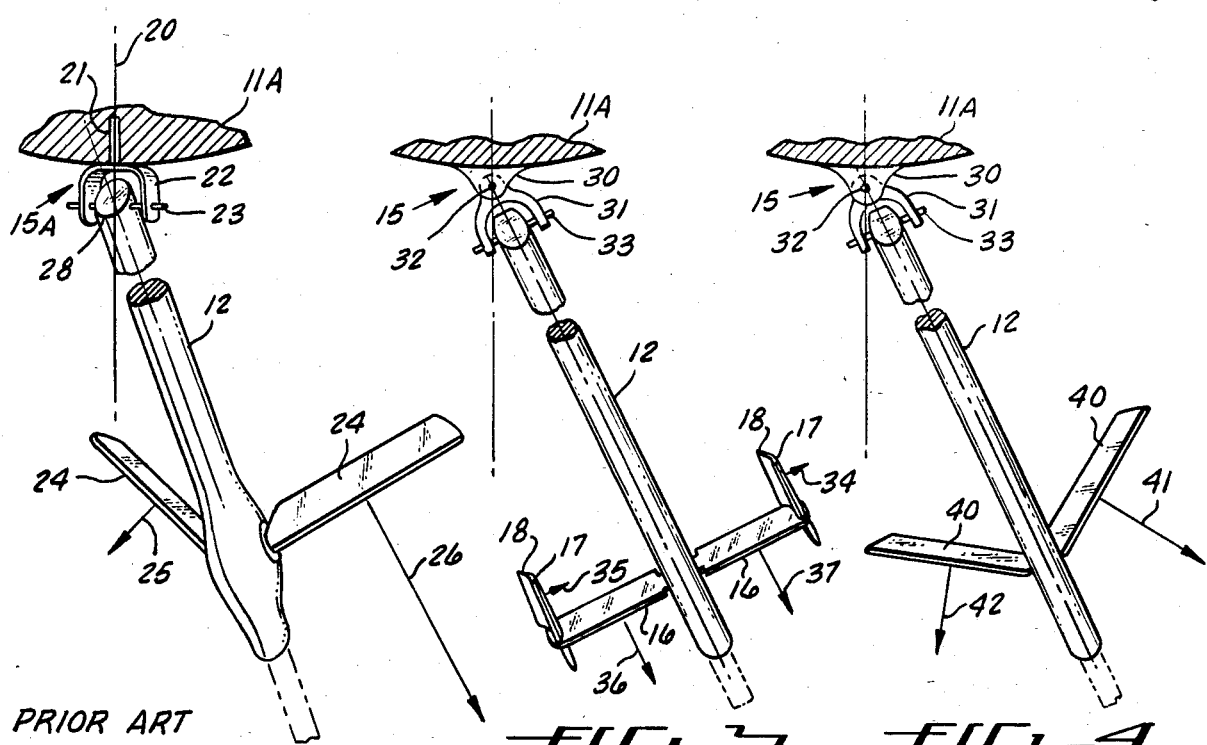
FIG. 2 is a view looking aft under the belly of the tanker aircraft of a front view of a deployed boom which is known in the state of the art. The boom pivot means is shown schematically illustrating orientation and vector loads on the boom control vanes. Control cables and/or wires as well as the fuel line have been removed for clarity.
FIG. 3 is a similar view to that shown in FIG. 2 except that the boom pivot means reflects the concept of the instant invention and the boom is shown with a "U" configuration of the control vanes.
FIG. 4 is a similar view to FIG. 3 except that a "vee" configuration of the control vanes is shown.

FIGS. 2, 3 and 4 illustrate the effect that the type of pivot means employed to attach the boom to the tanker aircraft has on boom motion and orientation of its control vanes. The view, in each case, is a front view of the deployed boom shown deflected to the low outboard region of its displacement envelope.

The arrows shown projecting from the control vanes are vector forces which represent, qualitatively, the relative magnitudes of the vane lift forces required to hold the boom in the deflected position.

FIG. 2 shows the conventional yawing boom pivot arrangement, which is known in the state-of-the-art, having a vertical axis 20, about which the pivot pin 21 rotates to provide lateral movement of the boom. The pivot pin 21 which is fixed to the tanker 11A except for rotation about its longitudinal axis 20, is attached to the yoke 22. The yoke 22 contains the pitch axis 23 to which is attached the boom 12. Attached to the rear portion of the fixed boom section 12 is a pair of air reaction surfaces, projecting generally horizontally from opposite sides of the trailing portions of the boom and having a considerable dihedral angle, generally known as rudevators 24. The rudevators perform the function of both rudder and elevator. This empennage configuration is generally known as a "vee" tail. As previously indicated, FIGS. 2, 3 and 4 are schematic representations to better understand the mechanics of motion of the boom. The oblique view of the elliptical boom section at 28 indicates the degree to which the boom 12 has been twisted toward a broad side, high drag orientation with respect to the air stream. The chord axis (long dimension) of the boom cross section, which reduces the drag at zero yaw, is detrimental at large yaw angles when it is broad side to the airstream. This is true of any kind of fixed fairing on a yawing boom and severely restricts possibilities of streamlining.

Inefficient control vane operation is indicated by the great difference in required vane airloads as shown by the arrows at 25 and 26. High induced drag on the control vanes adds to the boom drag moments, requiring additional down-load to trim the boom.

FIG. 3 is a schematic representation illustrating the arrangement of an aerial refueling system embodying the present invention. In particular, the boom pivot arrangement 15 is to be noted. Distinct from the described prior art, the first axis of rotation for the boom which is fixed to the tanker fuselage is horizontally oriented as opposed to the vertical orientation of this axis in the prior art of FIG. 2. Ideally, this first axis of rotation would be maintained exactly parallel to the air stream; however, moderate skewing of this axis may be desirable to enhance boom stability characteristics. Attached to the tanker fuselage 11A is the clevis 30 which in turn rotatably supports the yoke 31 via the roll pivot pin 32. The yoke 31 in turn supports the boom 12 via the pitch pivot pin 33.

It is now apparent that the pitch axis 33 rolls with the boom about the longitudinal axis 32, which is oriented approximately parallel to the air stream, and as a result the boom cross-section always presents its leading edge to the air flow, regardless of the roll deflection required to position the boom 12 laterally. The boom motion mechanics support this conclusion since the boom section chord plane always contains the roll axis and therefore the boom section angle of attack to the air stream is always small. Since the lateral air loads imposed on the boom are near zero, the rudder area requirements are dictated by the relatively small boom weight component which resists lateral boom deflection. Since the vane assembly does not yaw and the required rudder trim deflections are moderate, it is practical to employ a boom empennage type generally known as a "U"-type tail. Therefore, integrally attached to the rear portion of the fixed boom section 12 is a horizontal lift surface called an elevator 16 which may be all-movable or it may have a hinged trailing edge surface for control. In either case, the horizontal vane air loads are small and a relatively slender, lightly loaded, pivot bearing unit may be employed reducing boom interference to a minimum. A fixed fin 17 is attached to each outboard end of the elevator 16. The fins 17 support the hinged rudders 18 and the rudder actuators not shown. The rudders 18 are shown deflected toward the aircraft center line to develop the small outward air loads 34 and 35 required to balance the inward rolling moment due to boom weight. The elevator 16 is shown deflected to a negative angle of attack to develop the downward air loads 36 and 37, which are approximately symmetrical except for small induced effects of the rudder loads. The total empennage load represented by the arrows at 34, 35, 36 and 37 is seen to be appreciatively smaller than that of FIG. 2 represented by the sum of the arrows 25 and 26. This reduction in air loads is the result of reduced aerodynamic moments of the rolling boom and the more efficient uniform loading possible with the rolled vanes.

FIG. 4 shows the same boom described above in FIG. 3 with a rudevator type pair of air reaction surfaces 40 attached to the boom 12 for aerodynamic control similar to that shown in the prior art of FIG. 2. The relative rudevator air loads 41 and 42 required for vee configuration control vanes on the same rolling boom indicate somewhat greater vane lift is required than for the "U" type vanes described above and shown in FIG. 3. However, improved effectiveness over the prior art of FIG. 2 due to rolling the "vee" empennage is indicated by the increased loading possible on the inboard vane, i.e., the loading is much more symmetrical.

FIG. 5 represents a reduction to practice of the boom pivot means shown schematically in FIGS. 3 and 4 reflecting an adjustable two position roll axis pivot. While the representation is a side view, the structure is symmetrical about a vertical center line located to generally bisect the fuel line 45.

The fuel line 45 connects to the flexible bellows 46 with a flanged connection at 47. The bellows 46 accommodates pitch plane motion of the boom in the fuel line. The other end of the bellows 46 is flange connected at 48 to the swivel connector 49 which in turn connects to the boom fuel line 50. Boom motion about the roll axis is accommodated in the fuel line by the swivel connector 49. Fuel lines in the alternate boom positions shown in reference lines in FIG. 5, reflecting stowed and fully deployed boom positions, have been removed for clarity.

Attached to the tanker aircraft structure 11B is the trunnion support 51. Provided as an integral part of the trunnion support 51 is a pair of clevises, one of which is shown at 52, (the second of which is located immediately in back of the first and on the other side of the line of symmetry) the inner perimeter of which is scribed by the hidden line at 53. The clevis hole at 54 is provided with a suitable bushing, not shown, which accommodates a pair of trunnion bolts 55 which in turn support the roll trunnion housing 56 via a pair of tabs 57 integrally attached to the housing 56. The in line pair of pivots at 54 provide a first pitch axis of rotation for the boom 12B.

The roll trunnion housing 56 accommodates a pair of bearings 58 and 60 which in turn support the roll trunnion axle 61. The roll trunnion axle 61 terminates one end 62 in a cylindrical section and the other end 63 in a yoke which is canted with respect to the centerline of the cylindrical section 62. The bearing 58 is located and retained by the spacer 64 and the retainer 65. The bearing 60 is located and retained by a pair of shoulders at 66 and 67, a retainer 68 and a spacer 70 and a nut 71.

Symmetrically located on either side of one end of the 56 roll trunnion housing is a pair of pins 72 (again, only one is shown). Pivotally attached to the pin 72 is the link 73 which in turn is attached to the crank 74 by the pin 75. The crank 74 is fixedly attached to the shaft 76 which is rotatably supported in a pair of bearings (not shown) mounted in the trunnion support 51. Also fixedly attached to the shaft 76 is the bell crank 77 by the bolt 78. One end of the bell crank 77 is attached to the bungee assembly 80 (shown in part only) by the pin 81 which applies a biasing force to the bell crank 77 and in turn the shaft 76. The other end of the bell crank 77 is shown against one adjustable stop which is formed from a boss 82 which is an integral structural part of the trunnion support 51, along with a bolt 83 and a pair of nuts 84. A similar adjustable stop 85 is provided on the distal end of the trunnion support 51 which engages the same end of the bell crank 77 when the boom is placed in the stowed position.

The roll trunnion assembly rotates 32½° about the first pitch axis 54. Its position with the boom in the deploy position is shown in solid line, FIG. 5, with its center line at 86. The center line is oriented 5° off axis to the tanker water line for stability and control reasons as discussed earlier. Rotation of the trunnion about the axis 54 results in motion of the link 73 about the pin 72 which in turn moves the crank 74 which is attached to and rotates the shaft 76. Rotation of the shaft 76 results in rotation of the bell crank 77 which in turn extends the bungee assembly 80 attached to the other end of the bell crank 77 as at 81. When the boom is in the stowed position, the position of the rolled trunnion assembly and its attaching mechanism is shown about the center line at 87 in phantom lines.

Pivotally attached to the yoke end 63 of the trunnion axle 61, by a pair of bolts 88 (again, only one is shown as the second lies immediately in back of the first and on the opposite side of the plane of symmetry) inserted in bushings 90, is the boom support 91. The boom support 91 is in turn attached to the boom 12B. The boom thus rotates about a second pitch axis at 92. A pair of adjustable stops 93 is provided in the yoke 63 which limits the motion of the boom 12B about the axis 92 toward the stowed position. No stops are provided in the opposite direction. Movement in the deploy direction is limited only by the force which the horizontal vane 16 of FIG. 1 can apply, as previously discussed. Range of motion about the axis 92 is shown as a minimum of 25 degrees and represents pitch axis motion in the refueling envelope. Thus, in typical operation, the boom is rotated from the stowed position about the axis 54 to the deploy position. Initial pitch plane motion is insured about the axis at 54 by the bungee 80 which applies a biasing force as previously discussed. All maneuvering pitch axis motion then takes place about the axis 92 through the full limits of the refueling envelope while transverse motion of the boom 12B takes place in the form of an arc about the axis 86 of the trunnion shaft 61.

While flow-field characteristics in the region of the boom vary between tankers, e.g., KC-135 and DC-10 tankers, as well as variations in receiver aircraft, use of the rolling boom of this invention provides significantly greater safety, control, and boom disconnect and control envelopes over the prior art. This invention is not limited to the embodiment disclosed above but all changes and modifications thereof not constituting deviations from the spirit and scope of the invention are intended to be included.

What is claimed is:

1. A maneuverable apparatus for interconnecting a high speed supply aircraft with a trailing receiver aircraft in flight, consisting of:
   first pivot means mounted to said supply aircraft to provide angular motion about an axis of rotation oriented essentially parallel to the line of flight of said supply aircraft at the time of maneuvering said apparatus;
   second pivot means attached to and rotating with said first pivot means to provide angular motion in a generally vertical plane about an axis of rotation perpendicular to the axis of said first pivot means;
   a boom, extending generally fore and aft, but disposed at an angle to said axis of said first pivot means and attached to said second pivot means; and
   means to affect movement of said boom about said first and second pivot means, whereby lateral displacement of said boom is accomplished by rolling the boom in an arc, the radius of the arc being determined by the displacement of the boom about said second pivot means.

2. The apparatus as recited in claim 1 wherein said boom has faired aerodynamic sections so that when said boom rotates about said axis of rotation of said first pivot means, which is maintained essentially parallel to the line of flight, said boom maintains a small section angle of yaw with minimum aerodynamic forces.

3. A maneuverable, trailing apparatus for interconnecting a high speed supply airplane with a trailing receiver aircraft in forward flight, for the purpose of aerial refueling, consisting of:
   first pivot means mounted to said supply airplane to provide angular motion about an axis of rotation oriented essentially parallel to the line of flight of said supply airplane;
   second pivot means attached to and rotating with said first pivot means to provide angular motion in a generally vertical-longitudinal plane about an axis of rotation perpendicular to the axis of said first pivot means;
   a boom attached to said second pivot means, extending generally fore and aft, but disposed at an angle to said axis of rotation of said first pivot means; and
   means to affect movement of said boom about said first and second pivot means, whereby lateral displacement of said boom is accomplished by rolling the boom in an arc, the radius of the arc being determined by the displacement of the boom about said second pivot means.

4. The apparatus as recited in claim 3 wherein said boom has faired aerodynamic sections so that when said boom rotates about said axis of rotation of said first pivot means, which is maintained essentially parallel to the line of flight, said boom maintains a small section angle of yaw with minimum aerodynamic forces.

5. The apparatus as recited in claim 4, wherein said means to affect movement of said boom about said first and second pivot means are air reaction control surfaces mounted on said boom so as to rotate and thereby move said boom.

6. The apparatus as recited in claim 5, wherein said first and second pivot means axes are nonplanar.

7. The apparatus as recited in claim 5, wherein said boom rotates about said second pivot means from a stowed position above horizontal to a fully deployed position 45° below horizontal.

8. The apparatus as recited in claim 5, in which said first and second pivot means comprise a yoke which is journaled in a clevis which is attached to said supply aircraft for rotation of said yoke about a yoke journal axis which is oriented essentially parallel to the line of flight of said supply aircraft at the time of maneuvering said apparatus and during interconnection of said supply aircraft and said receiver aircraft and said boom is pivotally supported by said yoke providing a yoke axis which is perpendicular to said yoke journal axis.

9. The apparatus as recited in claim 8, wherein said yoke journal axis and said yoke axis are nonplanar.

10. The apparatus as recited in claim 8, wherein said boom rotates about said yoke axis from a stowed position above the line of flight of said supply airplane to a fully deployed position 45° below the line of flight of said supply airplane.

* * * * *